Figure 1:
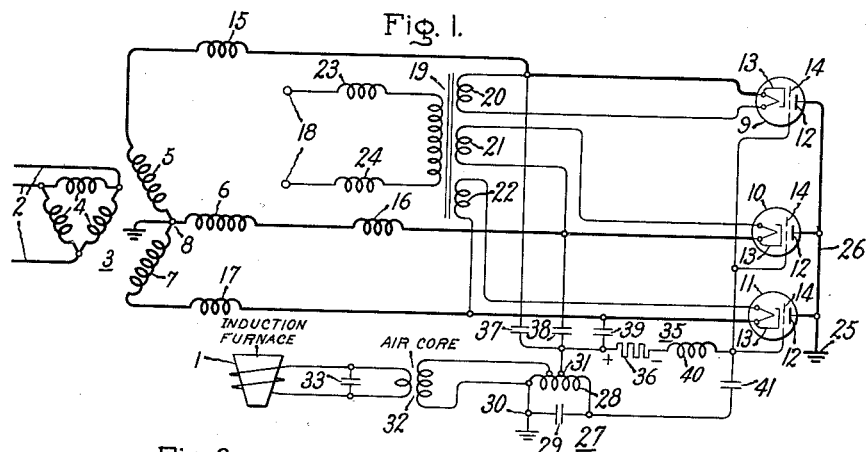

June 30, 1942.   E. D. McARTHUR   2,288,362
ELECTRIC VALVE FREQUENCY CHANGER
Filed Aug. 17, 1940   3 Sheets-Sheet 1

Inventor:
Elmer D. McArthur,
by Harry E. Dunham
His Attorney.

June 30, 1942.   E. D. McARTHUR   2,288,362
ELECTRIC VALVE FREQUENCY CHANGER
Filed Aug. 17, 1940   3 Sheets-Sheet 2
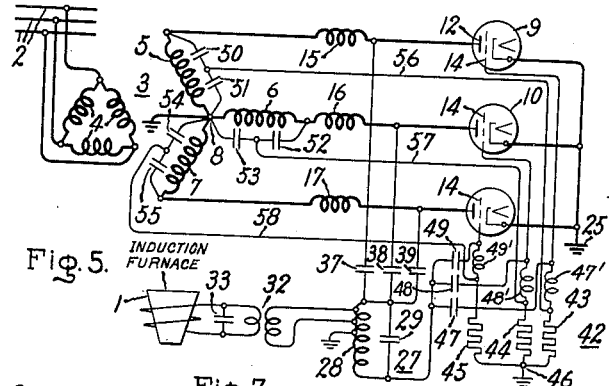
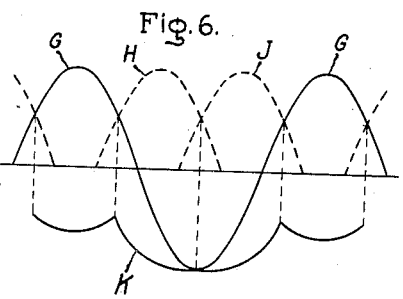
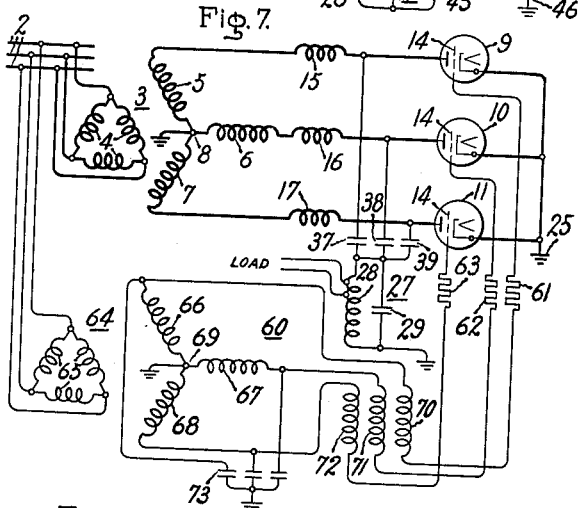
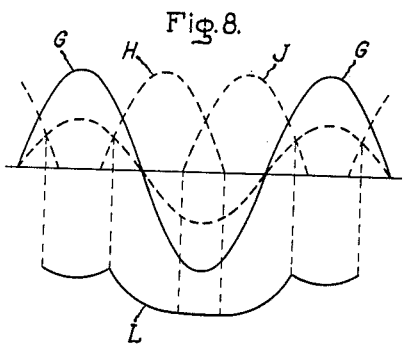
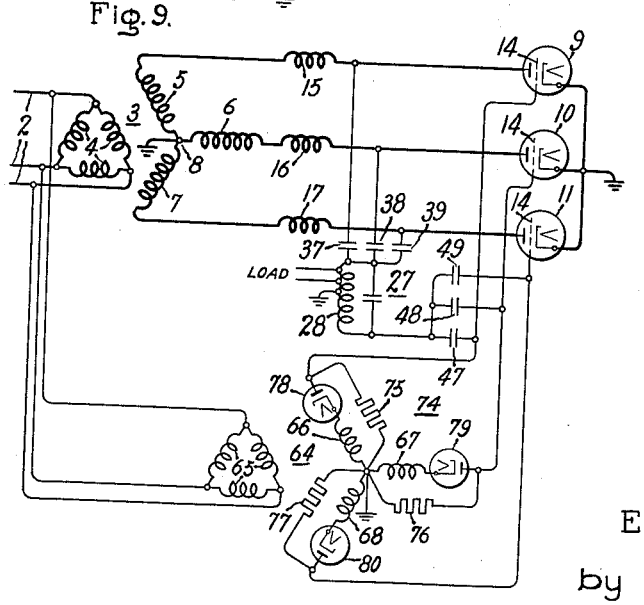
Inventor:
Elmer D. McArthur,
by Harry E. Dunham
His Attorney.

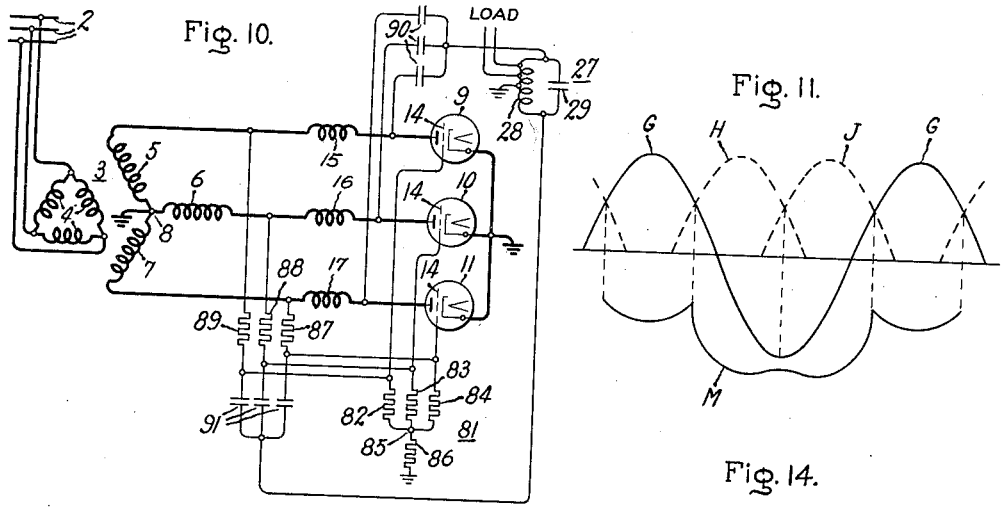

Patented June 30, 1942

2,288,362

UNITED STATES PATENT OFFICE 2,288,362

ELECTRIC VALVE FREQUENCY CHANGER

Elmer D. McArthur, Schenectady, N. Y., assignor to General Electric Company, a corporation of New York Application August 17, 1940, Serial No. 353,133

5 Claims. (Cl. 250—36)

My invention relates to electric valve frequency changers and more particularly to electric valve circuits for generating alternating currents of a frequency relatively high as compared with the frequencies of ordinary commercial power circuits.

This application is a continuation-in-part of my copending application Serial No. 257,229, filed February 18, 1939, and which is assigned to the assignee of this application.

In certain industrial applications as, for example, in systems for energizing high frequency induction furnaces, it is desirable to employ electric valve apparatus for generating alternating currents having frequencies relatively higher than commercial frequencies, and to derive the energy from alternating current circuits of commercial frequencies. Heretofore, the electric valve frequency changers or oscillator circuits which have operated from commercial alternating current supply circuits have been characterized by certain undesirable features. Among these undesirable features have been uneven distribution of the power demanded from the phases of the alternating current supply circuit, imposition of low power factor conditions, imposition of heavy single phase load on polyphase systems, low efficiency small utilization factor of the electric valve or electronic discharge devices employed, high initial cost and complexity of associated control circuit design. In accordance with the teachings of my invention described hereinafter, I provide new and improved electric valve frequency changer or electric valve oscillator circuits energized from an alternating current source of commercial frequency, and which obviate all of the above-mentioned disadvantages of the prior art arrangements.

It is an object of my invention to provide new and improved electric valve frequency changer circuits.

It is another object of my invention to provide new and improved electric valve oscillator circuits.

It is a further object of my invention to provide new and improved electric valve frequency changer circuits for energizing a relatively high frequency alternating current load circuit from an alternating current supply circuit of commercial frequency.

In accordance with the illustrated embodiments of my invention, I provide new and improved electric valve circuits for energizing a relatively high frequency alternating current load circuit, such as a high frequency induction furnace, from a polyphase source of alternating current of commercial frequency. The electric valve frequency changer comprises a plurality of phase windings electrically displaced and a plurality of electronic discharge devices of the high vacuum type, each having an anode, a cathode and a control grid, and arranged to have each of the electronic discharge devices energized from or associated with a different one of the phase windings. An oscillatory circuit, or a tank circuit, is connected to be energized by the phase windings and the electronic discharge devices. The phase windings are connected in wye and neutral point is grounded. The electronic discharge devices are each connected between ground and a different one of the phase windings; and the oscillatory circuit is connected to ground and to the phase windings through a plurality of capacitances. I provide a single grid circuit common to all the grids and which impresses on the grids a control voltage having one component which is a negative unidirectional biasing potential derived from the alternating current supply circuit by virtue of the grid rectification of the electronic discharge devices and a second component which is a high frequency component derived from the oscillatory circuit. Power is transmitted to the oscillatory circuit by the phase windings and the electronic discharge devices. Each of the electronic discharge devices transmits high frequency impulses during the greater portion of each positive half cycle of the applied low frequency anode-cathode voltage and, accordingly, transmits high frequency power to the oscillatory circuit. In one of the embodiments of my invention, all of the anodes of the electronic discharge devices are connected to ground potential, thereby affording a simple circuit arrangement, and in another embodiment of my invention all of the cathodes are at ground potential. The presence of the negative unidirectional biasing potential derived from the alternating current supply circuit serves as a protective feature to limit the amount of grid current transmitted by the electronic discharge devices during the inverse or negative half cycles of applied anode-cathode voltage.

In accordance with another feature of the illustrated embodiments of my invention, I provide an electric valve frequency changer or oscillator circuit comprising a number of phase windings in excess of two and a corresponding number of electronic discharge paths, each having a control grid for controlling the conductivity thereof. The single control circuit which is common to all the control grids functions in conjunction with the applied anode-cathode voltages so that each electronic discharge device conducts pulses of current for the greater portion of each positive half cycle of applied anode-cathode voltage, thereby assuring that the utilization factor of each electronic discharge device or each electric discharge path is large, resulting in an increased efficiency of the apparatus employed.

Figures 2, 3:
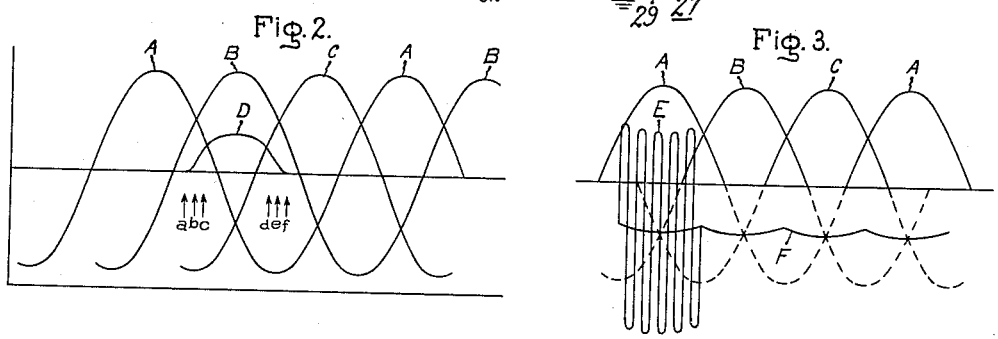
Figure 4:
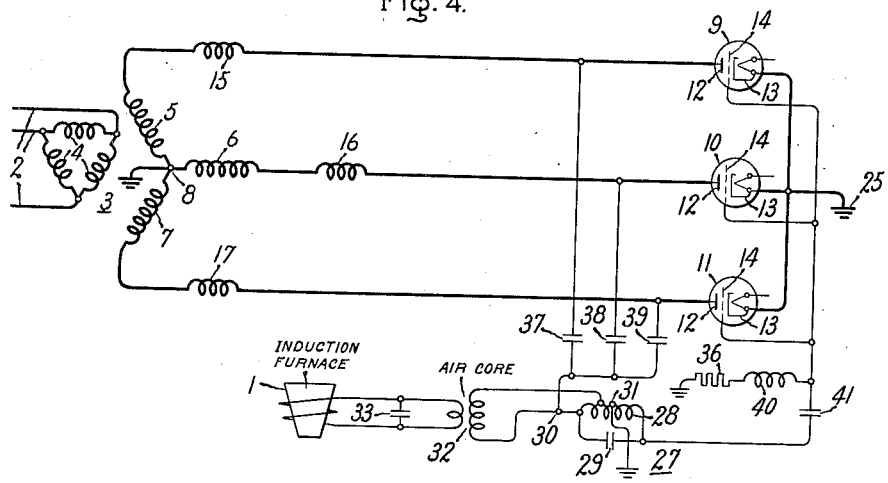

For a better understanding of my invention, reference may be had to the following description taken in connection with the accompanying drawings, and its scope will be pointed out in the appended claims. Fig. 1 diagrammatically illustrates an embodiment of my invention for energizing an induction furnace and in which the anodes of the electronic discharge devices are connected to ground potential through a common connection, and Figs. 2 and 3 represent certain operating characteristics thereof. Fig. 4 diagrammatically illustrates an embodiment of my invention in which the cathodes are common and are connected to ground through a common connection. Figs. 5 and 7 represent certain modifications of my invention, and Figs. 6 and 8, respectively, represent certain operating characteristics thereof.

Figs. 9 and 10 also relate to modifications of arrangements for limiting the grid currents during the inverse or negative half cycles, and Fig. 11 represents certain operating characteristics of the arrangement shown in Fig. 10. Fig. 12 is a further polyphase modification. Figs. 13 and 14 represent modifications of my arrangement which are designed to operate from single phase alternating current.

Referring now to Fig. 1 of the accompanying drawings, my invention is diagrammatically illustrated as applied to an electric translating system for energizing an alternating current load circuit 1 of relatively high frequency, such as an induction furnace from a polyphase alternating current supply circuit 2 of commercial frequency. The translating apparatus comprises an electric valve frequency changer or an electric valve oscillator including an inductive network, such as a transformer 3, having a plurality of primary windings 4 and a plurality of electrically displaced secondary or phase windings 5, 6 and 7. The secondary phase windings 5—7 may be connected in Y, having a common connection or a neutral connection 8 which may be connected to a point of reference potential, such as a ground connection. I provide a plurality of electric discharge paths each associated with a different one of the phase windings 5—7. For example, I employ a plurality of electronic discharge devices 9, 10 and 11 which are of the high vacuum type, each comprising a plurality of principal electrodes such as an anode 12, a cathode 13 and a control member or control grid 14. In the arrangement of Fig. 1, the cathodes 13 of electronic discharge devices 9—11 are connected to phase windings 5—7, respectively, through suitable smoothing inductive reactances 15, 16 and 17, respectively. Cathodes 13 may be energized from any suitable source of current, such as an alternating current circuit 18, through a transformer 19 having a plurality of secondary windings 20, 21 and 22. Inductances 23 and 24 may be connected in series relation with the primary winding of transformer 19 in order to absorb transients or high frequency currents which may be present in the circuit.

As a means for simplifying the circuit connections and as a means for effecting precise control of the operation of the electronic discharge devices 9—11, I connect corresponding principal electrodes, such as anodes 12 of all the electronic discharge devices 9—11, to a suitable point of reference potential, such as ground connection 25, through a suitable common conductor 26.

An oscillatory circuit or a tank circuit 27 is connected to be energized by the phase windings 5—7 and electronic discharge devices 9—11. The oscillatory or tank circuit 27 may be of any conventional type and may comprise a parallel connected inductance 28 and a capacitance 29. A suitable point 30 of the tank circuit 27 may be connected to ground or to a point of reference potential. The inductance 28 may be provided with a tap 31 for connection to the control or grid circuit to be described hereinafter. The load circuit 1, which in the arrangement illustrated comprises an induction furnace, may be coupled to the tank circuit 27 in any suitable manner, and for the purposes of illustration I have shown it as being connected to the inductance 28 of the tank circuit 27. An air core transformer 32 may be employed to transform the power to the desired current and voltage relationship for the proper energization of the load circuit 1, and, if desired, a power factor corrective impedance, such as a capacitance 33 for an inductive load or an inductance for a capacitive load, may be connected in circuit to improve the power factor conditions depending upon the reactive character of the load circuit.

I provide a single grid circuit 35 which is common to all of the control grids 14 of electronic discharge devices 9—11 and which impresses on these control grids a negative unidirectional biasing potential of substantial magnitude, in order to prevent transmission of large grid currents by these electronic discharge devices during the negative half cycles of applied anode-cathode voltage and to establish the proper operating point during the positive half cycles, and to thereby prevent injury to these devices. Of course, the high frequency component of voltage is also impressed on the control members 14 by virtue of the connection of the control circuit 35 to the tank circuit 27, and the resultant voltage impressed on the control grids 14 is the resultant or sum of the unidirectional biasing potential and the high frequency component of voltage. The control circuit 35 utilizes the grid rectification characteristic of the electronic discharge devices 9—11 and produces a negative unidirectional biasing potential by virtue of this characteristic. The control circuit 35 comprises a suitable impedance element, such as a resistance 36, which is energized by the unidirectional current transmitted between the cathode 13 and the control grids 14 of electronic discharge devices 9—11. Cathode feed capacitances 37, 38 and 39 are connected in the manner shown between the cathodes and the control circuit 35 to transmit the alternating components of current. A suitable smoothing inductance or choke 40 may be connected in series relation with the resistance 36. It will be noted that the left-hand terminal of the resistance 36, viewed in the drawing, is connected to tap 31 of inductance 28, thereby providing a path to ground potential or to the point of reference potential. A grid blocking capacitance or condenser 41 is connected between the grids 14 and the tank circuit 27.

It will be observed that the capacitances 37, 38 and 39 are each connected between a different one of the phase windings 5, 6 and 7 and the associated electronic discharge devices 9, 10 and 11, respectively, and are also connected to the tank circuit. These capacitances provide a path for the high frequency impulses occasioned by the operation of the electronic discharge devices 9—11.

The general principles of operation of the embodiment of my invention diagrammatically illustrated in Fig. 1 will be explained by considering the system when it is operating to transmit relatively high frequency alternating current, as for example alternating current within the region of 10,000 to 50,000 cycles, to the load circuit 1 from the alternating current supply circuit 2 which may be of a commercial frequency, such as 60 cycles. The electronic discharge devices 9, 10 and 11 conduct current in a predetermined order determined by the phase voltage of the voltages of windings 5, 6 and 7. Each electronic discharge device conducts current for a substantial part of the positive half cycle of applied anode-cathode voltage, and by virtue of this control conducts current for a portion of that time with each of the other electronic discharge devices. I have found that each of the electronic discharge devices 9, 10 and 11 conducts current for a period greater than $$\frac{2\pi}{n}$$

electrical degrees within each positive half cycle of anode-cathode voltage applied thereto from the supply circuit, where $n$ is equal to the number of phases of a polyphase circuit. For example, in the embodiment illustrated in Fig. 1, where the supply circuit 2 is a three-phase circuit, each of the electronic discharge devices conducts current for a period substantially greater than 120 electrical degrees.

Power is transmitted to the oscillatory or tank circuit 27 from the phase windings 5, 6 and 7 by the operation of the electronic discharge devices 9, 10 and 11. Each of the electronic discharge devices 9, 10 and 11 transmits high frequency electrical impulses during the positive half cycle of applied anode-cathode voltage of the low frequency alternating voltage provided by the phase windings 5, 6 and 7, respectively. The high frequency current flows through a circuit including electronic discharge devices 9, 10 or 11, capacitances 37, 38 or 39, the left-hand portion of inductance 28, terminal 30 and ground 25. The rectified low frequency current flows through phase winding 5, 6 or 7, inductance 15, 16 or 17, electronic discharge device 9, 10 or 11, conductor 26, ground 25, and terminal 8.

Because each of the electronic discharge devices 9, 10 and 11 transmits high frequency alternating currents, the potentials of the cathodes 13 rise and fall in accordance with the high frequency voltage variations and these high frequency impulses are transmitted to the oscillatory circuit or tank circuit 27 through capacitances 37, 38 and 39. High frequency alternating current is transmitted to the load circuit 1 from the oscillatory or tank circuit 27 through transformer 32.

By utilizing the grid rectification characteristic of the system and the operation of the control circuit 35, there is provided a substantial negative unidirectional biasing potential derived from the low frequency supply circuit 2, thereby affording a protection by limiting the grid currents transmitted by the electronic discharge devices 9–11 during the negative half cycles of applied anode-cathode voltage as well as aiding in the control of the current during the positive half cycles so that high power conversion efficiency may be attained. The source of grid excitation which is common to all the control grids 14 is present at all times, and the electronic discharge devices 9–11 conduct current as soon as the anodes become positive with respect to the cathodes.

For a better understanding of the operation of the embodiment of my invention shown in Fig. 1, reference may be had to Fig. 2 and Fig. 3 which show certain operating characteristics thereof. Curves A, B and C of Fig. 2 represent the anode-cathode voltages of the electronic discharge devices 9, 10 and 11, respectively. At time (a) electronic discharge device 10 begins to conduct power to the oscillating system, since it is fully excited by oscillations generated by electronic discharge device 9. During the interval a—b, it may be considered that electronic discharge device 10 is an amplifier driven by electronic discharge device 9. During the interval b—e, discharge device 10 operates as an oscillator, and in turn drives discharge device 9 during the interval b—c, and drives discharge device 11 during the interval d—e.

Each of the electronic discharge devices 9, 10 and 11 conducts current for a period greater than the 120 electrical degree period and consequently has a utilization factor greater than $$\frac{2\pi}{n}$$

and less than 0.5, where $n$ is the number of phases of the translating apparatus. In the embodiment of the invention illustrated in Fig. 1, of course, $n$ is equal to 3. An important advantage of high frequency electronic generators, built in accordance with my invention, is the fact that the system operates to energize continuously the high frequency load circuit even during the commutating periods established by the anode-cathode voltages of the low frequency alternating current supply circuit. Oscillographic studies of the high frequency voltage supplied to the load circuit indicate that this voltage is continuous and that the commutation of current between the electronic discharge devices 9, 10 and 11 is effected in a smooth and positive manner. This transfer of current during the commutation intervals is effected by virtue of the control circuit which interconnects the grids 14 of discharge devices 9, 10 and 11 with the alternating current supply circuit.

The operating characteristics of Fig. 3 represent the manner in which the negative unidirectional biasing potential is produced by control circuit 35, particularly the voltage appearing across the resistance 36. Curve E represents the high frequency component of voltage derived from the tank circuit 27, through capacitance 41, and curve F represents the negative unidirectional biasing potential impressed on all of the control grids 14. Of course, curve F also represents the voltage appearing across the terminals of resistance 36. It will be noted that the wave form of the voltage of curve F is substantially that of the rectified voltage obtained by rectifying the three phase voltages provided by phase windings 5, 6 and 7. It is also emphasized that the biasing voltage is derived from the supply circuit 2 and is always of a substantial value to prevent the conduction of an excessive amount of grid current by the electronic discharge devices during those intervals in which it is desirable to limit the current conducted.

Among the principal advantages of my invention, it will be appreciated that inasmuch as the electronic discharge devices conduct current during a large part of each positive half cycle of applied anode-cathode voltage, the power demanded from the polyphase alternating current supply circuit 2 remains substantially constant, and that there is no phase unbalance inasmuch as the load is derived equally from all phases.

Fig. 4 diagrammatically illustrates an embodiment of my invention which is a modification of the arrangement shown in Fig. 1, and corresponding elements have been assigned like reference numerals. In the arrangement of Fig. 4, the cathodes have a common connection and are connected to a point of reference potential, such as ground, and the anodes are connected to the phase windings 5, 6 and 7. In the modified arrangement of Fig. 4, the left-hand terminal of the resistance 36 is connected to the reference or ground potential, and the common juncture of the capacitances 37, 38 and 39 is connected to terminal 30 of inductance 28 instead of being connected to the tap 31. Tap 31 is connected to a point of reference potential or to ground.

Fig. 5 diagrammatically illustrates another modification of my invention as applied to a high-frequency electronic generator. The arrangement of Fig. 5 is similar in many respects to that shown in Fig. 1 and corresponding elements have been assigned like reference numerals. The arrangement of Fig. 5 comprises means for impressing on the grids 14 negative unidirectional biasing potentials which vary in magnitude in a manner to limit the grid currents during the negative or inverse negative half cycles of applied anode-cathode voltage. That is, means are provided to increase in magnitude the negative unidirectional biasing potential during the inverse half cycles in order to limit the grid currents during these half cycles. I provide a control circuit 42 comprising impedance elements such as resistances 43, 44, and 45 which are connected to grids 14 of electronic discharge devices 9, 10, and 11 respectively. The common juncture 46 of the resistances 43—45 are connected to ground, that is, are connected to the point of reference potential. The control circuit 42 is coupled by suitable means such as capacitances 47, 48, and 49 to the oscillatory circuit 27 as a means for transmitting the high-frequency components of voltage from oscillatory circuit 27 to the grids 14. I provide capacitances 50—55, inclusive, which are connected in pairs across the phase windings 5, 6 and 7 of the transformer 3. The neutral connections of the respectively associated pairs of capacitances are connected to grids 14 of discharge devices 9, 10 and 11 through conductors 56, 57 and 58, respectively.

Suitable choke coils 47', 48' and 49' are associated with the grids 14 of electronic discharge devices 9, 10, and 11 to prevent the transmission of the high frequency impulses of circuit 27 to the transformer 3 and the resistances 43, 44, and 45.

The embodiment of my invention shown in Fig. 5 operates to transform alternating current of commercial frequency, such as 60 cycle alternating current, to alternating current of a relatively higher frequency, such as alternating current having a frequency lying within the range from 10,000 to 50,000 cycles per second.

One of the particular advantages of the arrangement shown in Fig. 5 is the fact that the control circuit 42 produces negative biasing potentials which become greater in value during the negative half cycles of applied anode-cathode voltage thereby limiting the grid currents during those half cycles and preventing damage or injury to the electronic discharge devices.

Negative unidirectional biasing potentials are produced across the terminals of resistances 43—45 by the grid rectification characteristics of the electronic discharge devices 9—11. A 60 cycle component of potential is impressed on the grids 14 through conductors 56—58. The grid rectification characteristics of the discharge devices produces across the resistances 43—45 unidirectional biasing potentials due to the potential derived from the supply circuit 2 through capacitances 50—55 and transformer 3.

The manner in which the negative unidirectional potentials are increased in magnitude during the negative half cycles of applied anode-cathode voltage may be more readily appreciated by referring to the operating characteristics shown in Figure 6. Curve G represents the low frequency anode-cathode voltage applied to one of the discharge devices, such as electronic discharge device 9 from circuit 2. Curves H and J represent the positive half cycles of voltage applied to electronic discharge devices 10 and 11. These latter curves are not shown completely; the negative cycles thereof are omitted for the purposes of clarity. Curve K represents the magnitude of the negative unidirectional biasing potential impressed on grid 14 or electronic discharge device 9. It will be understood that the biasing potentials impressed on grids 14 of discharge device 10 and 11 are not represented, but that corresponding biasing potentials of the proper phase displacement are also impressed on these grids. The high frequency components of voltage which are impressed on the grids 14 are not represented in Fig. 6. It will be understood that such components are necessarily present and are impressed on grids 14 by coupling capacitances 47—49 from the oscillatory circuit 27.

During the positive half cycle of anode-cathode voltage impressed across discharge device 9 the negative biasing potential impressed on grid 14 is of a value sufficient to permit the discharge device 9 to transmit the desired high frequency impulses, the energy of course being derived from supply circuit 2 through secondary winding 5 of transformer 3. As the anode-cathode voltage becomes negative, I have found that the grid 14 tends to transmit a large amount of current. The grid tends to act as an anode relative to the anode 12. By providing the resistances 43—45, and in particular resistance 43 which acts as an individual resistor for device 10, this increase in current tends to increase the negative biasing potential appearing across the terminals of resistance 43 thereby serving as a self-limiting arrangement for maintaining the grid current below that value which would injure the electronic discharge device.

A still further embodiment of my invention is diagrammatically illustrated in Fig. 7. I provide a high frequency electronic generator energized from an alternating current circuit and which includes a control circuit 60 which impresses on the grids 14 of electronic discharge devices 9, 10 and 11 biasing potentials which vary in a manner during the negative half cycles of applied anode-cathode voltage to limit the grid currents. The control circuit 60 includes resistances 61, 62, and 63 connected in series relation with grids 14 and secondary windings 66, 67, and 68 of transformer 64, the primary windings 65 of which are connected to alternating current circuit 2. Neutral connection 69 of secondary windings 66—68 is connected to ground or to the point of reference potential.

The high frequency component of voltage for the grid excitation may be introduced into the control circuit 60 by means of windings 70, 71, and 72 which are inductively coupled to the oscillatory circuit 27. Suitable filtering means such as capacitances 73 may be connected across the windings 66—68 in a Y connection to ground to by-pass the high frequency components of voltage. The load circuit is shown as being connected to taps on the inductance 28.

The arrangement of my invention shown in Fig. 7 operates to transform alternating current of commercial frequency to high frequency alternating current. Electronic discharge devices 9 and 11 conduct current in a predetermined order or sequence determined by the order of phase rotation of the voltages of the alternating current circuit 2. Each discharge device conducts current for substantially 120 electrical degrees, that is, conducts current during a substantial part of the positive half cycle of applied anode-cathode voltage. The alternating components of potential provided by secondary windings 66—68 are arranged to be in phase with the applied anode-cathode voltages of the respective electronic discharge devices 9—11. These windings, in conjunction with the resistances 61—63, produce and impress on the grids 15 negative biasing potentials varying in a manner represented by curve L of Fig. 8. Of course, it will be understood that only one biasing potential is shown and that the biasing potential represented by curve L is correlated with respect to curve G. For example, the curve L represents the biasing potential impressed on grid 14 of electronic discharge 9 when curve G represents the anode-cathode voltage of discharge device 9. Properly correlated biasing potentials are also impressed on grids 14 of devices 10 and 11.

It will be understood that a high frequency component of voltage will also be impressed on grids 14 by virtue of the coupling between the control circuit 60 and the oscillatory circuit 27. The arrangement of Fig. 7 serves to limit the grid currents during the negative half cycles of applied anode-cathode voltage, that is, during the negative half cycle of the low frequency source 2. Since the windings 66—68 produce voltages substantially in phase with the voltages produced by windings 5—7, the biasing potential impressed on the grids 14 necessarily increases in the negative direction during the negative half cycles of anode voltage thereby establishing a limit to the current which the grid circuits are required to conduct and consequently protect the electronic discharge devices.

In Fig. 9 there is represented a still further embodiment of my invention having several elements corresponding to those shown in Fig. 5 and Fig. 7 and corresponding elements have been assigned like reference numerals. In order to impress on the grids 14 biasing potentials derived from the supply circuit 2 I provide a control circuit 74 comprising secondary windings 66—68 and impedance elements 75, 76 and 77 which are energized through rectifying devices 78, 79 and 80, respectively. The rectifying devices 78—80 transmit unidirectional currents through the resistances 75—77 to create thereacross negative unidirectional biasing potentials which occur during the negative half cycles of the applied anode-cathode voltage of the respective associated electronic discharge devices. In this manner the grid currents are limited during the inverse half cycles.

Fig. 10 diagrammatically illustrates another embodiment of my invention as applied to an electronic high frequency generator for energizing a high frequency load circuit from a source of alternating current of commercial frequency such as alternating current circuit 2. I provide a control circuit 81 which impresses on the grids 14 negative unidirectional biasing potentials derived from circuit 2 and obtaining by virtue of the grid rectification characteristics of the electronic discharge devices 9—11. The control circuit 81 comprises a plurality of impedance elements such as resistances 82, 83, and 84 connected to grids 14 of electronic discharge devices 9—11 respectively and are arranged to have a common connection 85. I also provide in control circuit 81 a resistance 86 connected between ground or the point of reference potential and the common connection 85 of resistances 82—84. The unidirectional biasing potentials impressed on grids 14 each comprises two components. One of these components is that which appears across the terminals of resistance 86 and is due to the summation or average of the grid rectification currents of all three of electronic discharge devices 9—11. The second component is that due to the flow of the individual grid rectification currents through the respective electronic discharge devices.

Control circuit 81 also comprises resistances 87, 88, and 89 which are connected between grids 14 of electronic discharge devices 9, 10, and 11 and secondary windings 7, 6, and 5, respectively. Oscillatory circuit 27 is coupled to the anodes of electronic discharge device 11 and to the control circuit 81 through groups of coupling capacitances 90 and 91, respectively.

The manner in which the control circuit 81 of Fig. 10 serves to limit the magnitude of the grid currents during the negative or inverse half cycles of anode-cathode voltage may be more fully appreciated by referring to the operating characteristics shown in Fig. 11. Curves G, H and J represent the respective anode-cathode voltages of electronic discharge devices 9—11, respectively, and curve M represents the negative unidirectional biasing potential impressed on grid 14 of electronic discharge device 9. It will be observed that the magnitude of the biasing potential increases substantially during the negative or inverse half cycle. It will be further appreciated that the biasing potentials impressed on grids 14 of electronic discharge devices 10 and 11 will be of the same phase relationship relative to their respective anode-cathode voltages. The increase in the biasing potential, as illustrated by curve M, during the negative half cycles is affected by the increase of current which flows through resistance 82. As the anode potential of electronic discharge device 9 becomes negative relative to the cathode, the grid 14 conducts a greater amount of current effecting an increased potential drop across resistance 82. In this manner circuit 81 tends to limit the grid current by increasing its bias.

A further polyphase modification of a high frequency electronic generator is illustrated in Fig. 12. The grids 14 of electronic discharge device 9—11 are connected to the oscillatory circuit 27 through capacitances 92, 93, and 94 which are coupled to the oscillatory circuit by means of winding 95 which is inductively associated with inductance 28. Suitable filtering means such as a resistance 96 and an inductance 97 are connected between the cathodes and the grids of each of the electronic discharge devices 9—11. These filtering means serve to prevent the transmission of high frequency impulses derived from the oscillatory circuit 27 directly to ground.

Fig. 13 diagrammatically illustrates a modification of my invention as applied to an electronic frequency changer for energizing a high frequency load circuit from a single phase alternating circuit 98 which may be of commercial frequency such as 60 cycles. The system comprises a transformer 99 having a secondary winding 100 provided with an intermediate or neutral connection 101 connected to ground or connected to a point of reference potential. A pair of electronic discharge devices 102 and 103 are arranged to operate in a push-pull relationship and each is provided with an anode 104, a cathode 105, and a grid 106. Filtering inductances 107 and 108 are connected in series relation with the associated portions of secondary winding 100 and electronic discharge devices 102 and 103. Corresponding principal electrodes, such as cathodes 105 of discharge devices 102 and 103, are connected to the point of reference potential or to the ground connection. The oscillatory circuit 27 is coupled to the anodes 104 of discharge devices 102 and 103 through capacitances 107 and 108 respectively. In addition, the oscillatory circuit 27 is also coupled to the grids 106 through capacitances 109 and 110.

As a means for selectively increasing the biasing potential impressed on the grids 106 during the negative or inverse half cycles of the anode-cathode potential of discharge devices 102 and 103, I provide a control circuit 111 comprising resistances 112 and 113 having a common connection 114. A further resistance 115 is connected between the common connection 114 and the ground connection or the point of reference potential.

The embodiment of my invention shown in Fig. 13 operates to transform the alternating current of commercial frequency, derived from circuit 98, into alternating current of a higher frequency. Electronic discharge device 102 and 103 alternately conduct low frequency alternating current and during the periods of conduction of low frequency current also transmit impulses of high frequency current. Of course, the high frequency excitation is derived from oscillatory circuit 27 through coupling capacitances 109 and 110.

Control circuit 111 produces unidirectional biasing potentials which increase during the negative half cycles of anode-cathode voltage. This selective variation in the magnitude of the biasing potential is obtained by virtue of the operation of resistances 112 and 113 acting in conjunction with resistance 115. Consider, as an example, one of the discharge devices such as discharge device 102 when its anode voltage becomes negative. The grid 106 tends to conduct an increased amount of unidirectional current causing an increase in the grid rectification current which flows between grid 106 and the ground connection through resistances 112 and 115 without materially interfering with the operation of device 103. In a like manner the biasing potentials impressed on grid 106 of discharge device 103 also increases during its inverse half cycles of anode-cathode voltage.

Fig. 14 represents diagrammatically a further single phase modification of my invention for energizing a high frequency load circuit from a source of commercial frequency. In the arrangement of Fig. 14 there is provided a control circuit 116 which impresses in the grids 106 of discharge devices 102 and 103 a component of voltage derived from supply circuit 98 through a transformer 117 having a secondary winding 118 provided with an intermediate or neutral connection 119. A resistance 120 is connected between the connection 119 and the ground or point of reference potential; and inductances 121 and 122 are connected between the secondary winding 118 and grids 106 to prevent the transmission of the high frequency impulses of circuit 27 to the transformer 117. Filtering capacitances 123 and 124 are also connected to bypass the high frequency impulses so that these high frequency impulses are not transmitted to the transformer 117.

The single-phase arrangement of Fig. 14 operates to limit the grid currents during the negative half cycles of anode-cathode voltage, that is, during the negative half cycles of the low frequency component of voltage derived from supply circuit 98. The low frequency component of voltage introduced into control circuit 116 by means of transformer 117 together with the high frequency excitation operates to impress on the grids 106 a rectified unidirectional biasing voltage by virtue of the grid rectification characteristics of the electronic discharge devices 102 and 103. This biasing potential appears across the terminals of resistance 120 and the associated positions of secondary winding 118 thereby selectively producing the desired increase in grid biasing potential at the times when it is required.

Various aspects of my invention, wherein the magnitudes of the biasing potentials which are impressed on the grids of the electric discharge devices are increased during the negative half cycles of voltage applied between the respective anodes and cathodes, are disclosed and claimed in my copending application Serial No. 388,702, filed April 15, 1941, which is a division of the instant application and which is assigned to the assignee of the present application. For example, the embodiments of my invention shown in Figs. 5, 7, 9 and 10 are claimed in divisional application Serial No. 388,702.

The embodiment of my invention shown in Fig. 12, wherein the biasing potentials impressed on the grids of the electric discharge devices are selectively increased in magnitude during the negative half cycles of applied anode-cathode voltage by means of grid circuits each including a serially connected inductance and a resistance, is claimed in my copending patent application Serial No. 388,704, filed April 15, 1941, which is a continuation-in-part of the instant application and which is assigned to the assignee of the present application.

The circuit arrangement shown in Fig. 13, wherein the magnitudes of the negative unidirectional biasing potentials are selectively increased during the negative half cycles of applied anode-cathode voltage in an oscillator arrangement which is energized from a single phase alternating current circuit, is claimed in my copending patent application Serial No. 388,703, filed April 15, 1941, and which is a continuation-in-part of the instant application and which is assigned to the assignee of the present application.

The circuit arrangement shown in Fig. 14 is being claimed in my copending patent application Serial No. 440,429, filed April 25, 1942, and which is assigned to the assignee of the present application. Application Serial No. 440,429 is a division of application Serial No. 388,702 which, in turn, is a division of the present application.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an $n$ phase alternating current supply circuit where $n$ is greater than 2, an alternating current load circuit of a frequency high relative to the frequency of said supply circuit, electric translating apparatus connected between said circuits and comprising an electric oscillator including a plurality of electrically displaced windings having a point thereof at ground potential, a plurality of electronic discharge devices each energized by a different one of said windings and each comprising an anode, a cathode and a control grid and an oscillatory circuit energized by said windings and said discharge devices, means for connecting the anodes of all of said electronic discharge devices to ground, means for connecting each of the cathodes to a different one of said windings, and a control circuit common to all the control grids and connected to provide a path between said grids and said point of reference potential and comprising a resistance for impressing on said grids an $n$ phase rectified negative unidirectional biasing potential produced by the combined action of the grid rectification characteristics of said electronic discharge devices.

2. In combination, an alternating current supply circuit, a high frequency alternating load circuit, electric translating apparatus connected between said circuits and comprising an electric oscillator including a plurality of electrically displaced windings having a common juncture, a point of reference potential, means for connecting said common juncture directly to said point of reference potential, a plurality of electronic discharge devices each connected to a different one of said windings and each including a plurality of principal electrodes including an anode, a cathode and a control grid and an oscillatory circuit energized by said windings and said electronic discharge devices, corresponding principal electrodes of said electronic discharge devices being connected to said windings and different corresponding principal electrodes being connected directly to said point of reference potential, a control circuit comprising means exclusive of the anode-cathode circuits of the electronic discharge devices and including a resistance for impressing on said grids a negative unidirectional biasing potential produced by the combined action of the grid rectification characteristics of said electronic discharge devices, and means for coupling said control circuit to said oscillatory circuit.

3. In combination, an alternating current supply circuit, a high frequency load circuit, electric translating apparatus connected between said supply circuit and said load circuit and comprising an electric oscillator including a plurality of electrically displaced windings having a common terminal connected directly to a point of reference potential, a plurality of electronic discharge devices each having an anode, a cathode and a control grid and an oscillatory circuit energized by said windings and said electronic discharge devices, means for connecting each of said cathodes to a different one of said windings and for connecting the anodes directly to said point of reference potential, and a control circuit comprising means exclusive of the anode-cathode circuits of said electronic discharge devices and common to all the control grids and connected to provide a path between said grids and said point of reference potential and comprising a resistance for producing a negative unidirectional biasing potential having a characteristic corresponding to the number of said windings.

4. In combination, an $n$ phase alternating current supply circuit, a high frequency load circuit, electric translating apparatus connected between said supply circuit and said load circuit and comprising an electric oscillator including a plurality of electrically displaced windings having a common terminal connected directly to a point of reference potential, a plurality of electronic discharge devices each having an anode, a cathode, and a control grid and an oscillatory circuit energized by said windings and said electronic discharge devices, means for connecting each of said cathodes to a different one of said windings and for connecting the anodes directly to said point of reference potential, and a control circuit comprising means exclusive of the anode-cathode circuits of said electronic discharge devices and common to said grids and connected between said grids and said point of reference potential through said oscillatory circuit and comprising a resistance for producing an $n$ phase rectified negative unidirectional biasing potential.

5. In combination, an $n$ phase alternating current supply circuit, a high frequency load circuit, electric translating apparatus connected between said supply circuit and said load circuit and comprising an electric oscillator including a plurality of electrically displaced windings having a common terminal connected directly to a point of reference potential, a plurality of electronic discharge devices each having an anode, a cathode and a control grid and an oscillatory circuit energized by said windings and said electronic discharge devices and comprising an inductance and a capacitance, means for connecting the anodes of said electronic discharge devices directly to said point of reference potential, and a control circuit common to said grids and connected between said grids and said point of reference potential through a part of said inductance and including a resistance for producing an $n$ phase rectified negative unidirectional biasing potential due to the conjoint action of the grid rectification characteristics of said electronic discharge devices.

ELMER D. McARTHUR.